United States Patent
Deicke

(10) Patent No.: US 9,531,240 B2
(45) Date of Patent: Dec. 27, 2016

(54) WIND TURBINE GENERATOR WITH GEAR UNIT COOLING SYSTEM INCLUDING RE-COOLING

(71) Applicant: Siemens Aktiengesellschaft, München (DE)

(72) Inventor: Matthias Deicke, Uetze/Schwüblingsen (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 14/839,051

(22) Filed: Aug. 28, 2015

(65) Prior Publication Data

US 2016/0065036 A1    Mar. 3, 2016

(30) Foreign Application Priority Data

Aug. 29, 2014 (EP) .................................... 14182831

(51) Int. Cl.
| | |
|---|---|
| F03D 11/00 | (2006.01) |
| H02K 9/10 | (2006.01) |
| F03D 9/00 | (2016.01) |
| H02K 7/116 | (2006.01) |
| H02K 7/18 | (2006.01) |

(52) U.S. Cl.
CPC ................. *H02K 9/10* (2013.01); *F03D 9/002* (2013.01); *F03D 15/00* (2016.05); *F03D 80/00* (2016.05); *H02K 7/116* (2013.01); *H02K 7/1838* (2013.01); *F05B 2260/20* (2013.01); *F05B 2260/232* (2013.01); *Y02E 10/722* (2013.01)

(58) Field of Classification Search
CPC ....................................................... F03D 11/00
USPC .......................................................... 290/55
See application file for complete search history.

(56) References Cited

U.S. PATENT DOCUMENTS

| | | | | |
|---|---|---|---|---|
| 6,520,737 | B1 * | 2/2003 | Fischer | ................... F16L 39/04 |
| | | | | 415/175 |
| 7,111,668 | B2 * | 9/2006 | Rurup | ..................... F03D 80/00 |
| | | | | 165/134.1 |
| 2009/0212560 | A1 | 8/2009 | Larsen | |
| 2010/0061853 | A1 | 3/2010 | Bagepalli | |
| 2010/0140952 | A1 * | 6/2010 | Jansen | ..................... F03D 9/002 |
| | | | | 290/55 |
| 2011/0012362 | A1 * | 1/2011 | Kawai | ....................... F03D 1/06 |
| | | | | 290/55 |
| 2011/0095539 | A1 * | 4/2011 | Tietze | ..................... F03D 80/00 |
| | | | | 290/55 |
| 2011/0140418 | A1 * | 6/2011 | Matsuo | ................... F03D 80/80 |
| | | | | 290/44 |

(Continued)

FOREIGN PATENT DOCUMENTS

| | | | |
|---|---|---|---|
| CN | 1834454 A | * | 9/2006 |
| DE | 102009048767 A1 | | 4/2011 |

*Primary Examiner* — Joseph Waks
(74) *Attorney, Agent, or Firm* — Henry M. Feiereisen LLC.

(57) ABSTRACT

A wind turbine includes a generator having a generator cooling system configured for passage of a cooling fluid, and a gear unit including a gear unit cooling system configured for passage of a cooling fluid. The gear unit cooling system includes a recooling unit which is configured to transmit during normal operation of the wind turbine thermal energy from the cooling fluid of the gear unit cooling system to air inside the generator or to the cooling fluid of the generator cooling system.

5 Claims, 2 Drawing Sheets

(56) References Cited

U.S. PATENT DOCUMENTS

| | | | |
|---|---|---|---|
| 2011/0221204 A1* | 9/2011 | Kim | F03D 1/00 |
| | | | 290/55 |
| 2011/0272949 A1* | 11/2011 | Matsuo | F03D 80/00 |
| | | | 290/55 |
| 2012/0124984 A1* | 5/2012 | Akashi | F03D 9/001 |
| | | | 60/398 |
| 2012/0148407 A1 | 6/2012 | Akashi et al. | |
| 2012/0256426 A1* | 10/2012 | Klein | F03D 80/70 |
| | | | 290/1 C |
| 2013/0336764 A1 | 12/2013 | Schmidt | |

* cited by examiner

WIND TURBINE GENERATOR WITH GEAR UNIT COOLING SYSTEM INCLUDING RE-COOLING

CROSS-REFERENCES TO RELATED APPLICATIONS

This application claims the priority of European Patent Application, Serial No. 14182831.9, filed Aug. 29, 2014, pursuant to 35 U.S.C. 119(a)-(d), the disclosure of which is incorporated herein by reference in its entirety as if fully set forth herein.

BACKGROUND OF THE INVENTION

The present invention relates to a wind turbine.

The following discussion of related art is provided to assist the reader in understanding the advantages of the invention, and is not to be construed as an admission that this related art is prior art to this invention.

Conventional wind turbines normally have as main components a tower, a support platform rotatably attached to the upper end of the tower, and a drive train arranged on the support platform. The drive train includes a rotor which is driven by wind and attached to a rotor shaft that is mounted on a bearing block. The rotor shaft is connected to a gear unit input shaft via at least one connecting element. The output shaft of the gear unit is connected to a generator rotor arranged in a generator housing. The generator is in turn connected to a frequency converter which is designed to control the generator and to feed energy produced by the generator into a power grid.

During the operation of a wind turbine, energy is drawn from the wind flow by the rotor, as a result of which the rotor is caused to rotate. The rotary movement of the rotor is transmitted via the rotor shaft to the gear unit which increases the rotational speed. The output shaft of the gear unit in turn drives the generator, which converts mechanical energy into electrical energy which is then fed into a power grid via the frequency converter.

To cool the generator and the gear unit, conventional wind turbines have a generator cooling system and a gear unit cooling system which are normally separate from one another. The generator cooling system is usually operated with air as a cooling fluid and is provided with an air-to-air heat exchanger which is designed such that during normal operation of the wind turbine it transmits thermal energy from the air present in the interior of the generator to the cooling fluid of the generator cooling system. Oil is mostly used as the cooling fluid for the gear unit cooling system, and extracts thermal energy from the gear unit during normal operation of the wind turbine. The energy absorbed is then extracted from the oil again by a recooling medium in a recooling unit of the gear unit cooling system, whereupon the oil is fed back to the gear unit. One disadvantage of wind turbines constructed in this way is that their structure is complex and expensive.

It would therefore be desirable and advantageous to provide an improved wind turbine which obviates prior art shortcomings and is of simple and inexpensive structure while yet being reliable in operation.

SUMMARY OF THE INVENTION

According to one aspect of the present invention, a wind turbine includes a generator including a generator cooling system configured for passage of a cooling fluid, and a gear unit including a gear unit cooling system configured for passage of a cooling fluid, the gear unit cooling system including a recooling unit configured to transmit during normal operation of the wind turbine thermal energy from the cooling fluid of the gear unit cooling system to air inside the generator or to the cooling fluid of the generator cooling system.

In accordance with the present invention, air inside the generator or cooling fluid of the generator cooling system is used as a recooling medium for the cooling fluid of the gear unit cooling system. Thus, the recooling unit of the gear unit cooling system is coupled to the generator or the generator cooling system, which results in a reduction in costs, components and volume. In addition, there is a saving in energy for the recooling of the cooling fluid of the gear unit cooling system.

According to another advantageous feature of the invention, the cooling fluid of the generator cooling system can be air and the cooling fluid of the gear unit cooling system can be oil, with the recooling unit being configured as an air-to-oil heat exchanger which is integrated into the generator cooling system and configured to transmit during normal operation of the wind turbine thermal energy from the cooling fluid of the gear unit cooling system to the cooling fluid of the generator cooling system. Thus, oil of the gear unit cooling system is recooled directly via the air of the generator cooling system.

According to another advantageous feature of the invention, the cooling fluid of the generator cooling system can be air and the cooling fluid of the gear unit cooling system can be oil, with the generator cooling system including an air-to-air heat exchanger configured to transmit during normal operation of the wind turbine thermal energy from air inside the generator to the cooling fluid of the generator cooling system to thereby cool the air, with the recooling unit being configured as an air-to-oil heat exchanger integrated into the generator and configured to transmit during normal operation of the wind turbine thermal energy from the cooling fluid of the gear unit cooling system to the air inside the generator. As a result, oil of the gear unit cooling system is not recooled directly by the air of the generator cooling system, but indirectly by air which is inside the generator and from which heat is extracted via the generator cooling system.

According to another advantageous feature of the invention, the cooling fluid of the gear unit cooling system can be oil and the cooling fluid of the generator cooling system can be water, with the recooling unit being configured as a water-to-oil heat exchanger which is integrated into the generator cooling system and configured to transmit during normal operation of the wind turbine thermal energy from the cooling fluid of the gear unit cooling system to the cooling fluid of the generator cooling system. In this way, water of the generator cooling system directly cools the oil of the gear unit cooling system.

According to another advantageous feature of the invention, the cooling fluid of the generator cooling system can be water and the cooling fluid of the gear unit cooling system can be oil, with the generator cooling system including a water-to-air heat exchanger configured to cool the air inside the generator and to transmit during normal operation of the wind turbine thermal energy from the cooling fluid of the generator cooling system to the air inside the generator, with the recooling unit being configured as an air-to-oil heat exchanger which is integrated into the generator and configured to transmit during normal operation of the wind turbine thermal energy from the air inside the generator to the cooling fluid of the gear unit cooling system. As a result, oil of the gear unit cooling system is recooled via the air in the interior of the generator, so that the gear unit cooling system and the generator cooling system are indirectly thermally coupled to one another.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
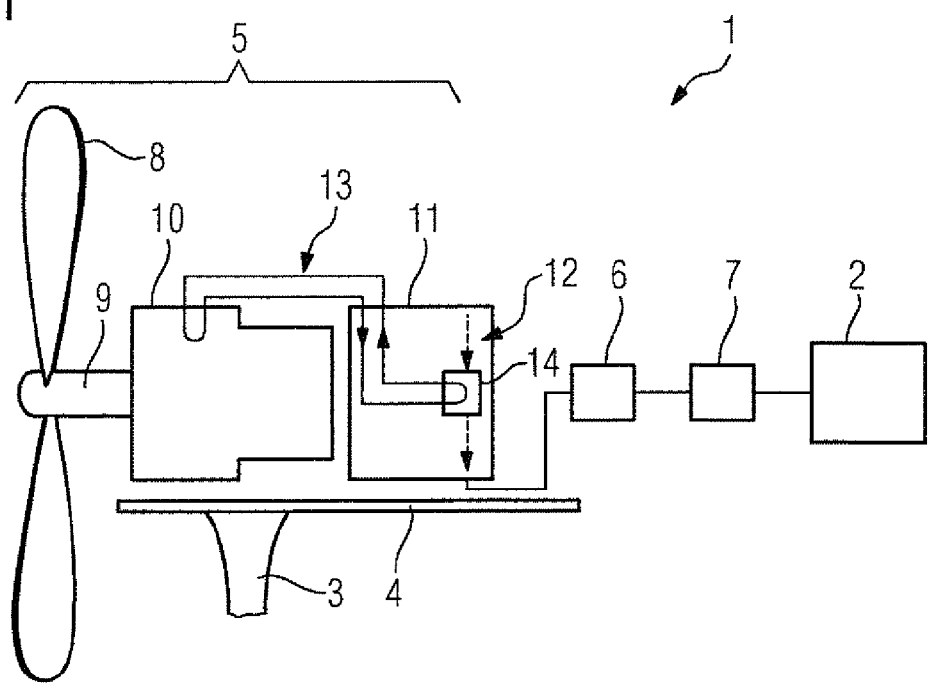
FIG. 1 shows a schematic illustration of a first embodiment of a wind turbine according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a first embodiment of a wind turbine according to the present invention, generally designated by reference numeral 1 and connected to a supply grid 2. The wind turbine 1 has as main components a tower 3, a support platform 4 rotatably attached to an upper end of the tower 3, a drive train 5 arranged on the support platform 4, and a frequency converter 6 which is normally also positioned on the support platform 4 and connected to the supply grid 2 via a transformer 7. The drive train 5 has a rotor 8 which is driven by wind and attached to a rotor shaft 9 that is mounted on a bearing block. The rotor shaft 9 is guided into a gear unit 10, the output shaft of which is connected to a generator rotor of a generator 11. The generator 11 is in turn connected to the frequency converter 6 which is designed to control the generator 11 and to inject the energy produced by the generator 11 into the power grid 2.

The generator 11 includes a generator cooling system 12 which is open-circuit cooled with air as a cooling fluid. In other words, air present in the interior of the generator 11 is formed by the cooling fluid of the generator cooling system 12 flowing through the generator 11 and is accordingly continually exchanged. The gear unit 10 has a gear unit cooling system 13 with a recooling unit 14 and is operated with oil as the cooling fluid. The recooling unit 14 is in this case an air-to-oil heat exchanger which is connected both to the generator cooling system 12 and to the gear unit cooling system 13.

During operation, the generator 11 is cooled by air flowing through the generator cooling system 12, and the gear unit 10 is cooled by oil which is conducted through the generator cooling system 12. The oil heated by the gear unit 10 is fed to the recooling unit 14, in which it dissipates the absorbed thermal energy to the air of the generator cooling system 12, whereupon the cooled oil is conducted back to the gear unit 10.

The structure of the wind turbine 1 illustrated in FIG. 1 is particularly advantageous in that because the recooling unit 14 of the gear unit cooling system 13 is integrated into the generator cooling system 12, savings can be made on components as well as on costs. Furthermore, the cooling power provided by the generator cooling system 12 is speed-dependent and thus output-dependent, which means that the cooling of the gear unit also automatically takes place on an output-dependent basis. Against this backdrop it is possible to dispense with additional control facilities for the output-dependent control of the gear unit cooling system 13, As a result, a simple and inexpensive structure of the wind turbine 1 is achieved.

The generator 11, illustrated in FIG. 1, can, of course, also be provided with closed-circuit cooling instead of open-circuit cooling, wherein the air present in the interior of the generator 11 and the cooling fluid of the generator cooling system 12 are separate from one another. In such a closed-circuit cooling the interior air of the generator 11 is cooled by the cooling fluid of the generator cooling system 12, for which purpose an air-to-air heat exchanger, which, although not shown in FIG. 1, is integrated in accordance with the present invention into the generator cooling system 12 downstream or upstream of the recooling unit 14 of the gear unit cooling system 13.

Figure 2:
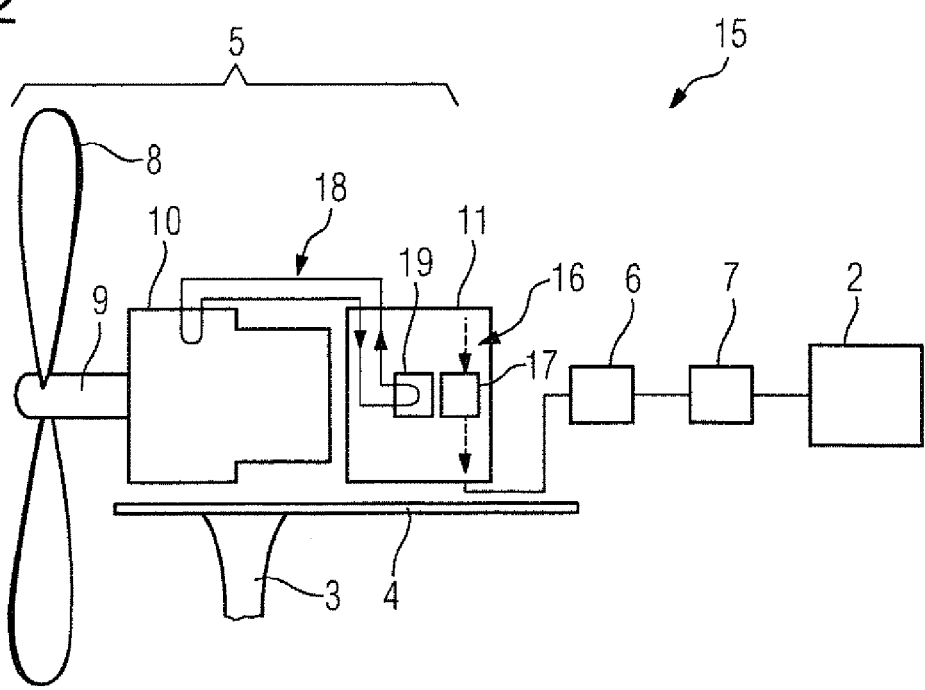
FIG. 2 shows a schematic illustration of a second embodiment of a wind turbine according to the present invention.

FIG. 2 shows a second embodiment of a wind turbine according to the present invention, generally designated by reference numeral 15. Parts corresponding with those in FIG. 1 are denoted by identical reference numerals and not explained again. The description below will center on the differences between the embodiments. In this embodiment, the wind turbine 15 includes a generator cooling system 16 which is operated with air as a cooling fluid and has an air-to-air heat exchanger 17 which is designed and arranged such that during normal operation of the wind turbine 15 it transmits thermal energy from the air present in the interior of the generator 11 to the cooling fluid of the generator cooling system 16. A gear unit cooling system 18 of the wind turbine 15 is operated with oil as the cooling fluid and includes a recooling unit 19, which in this case is an air-to-oil heat exchanger which is designed and arranged such that during normal operation of the wind turbine 15 it transmits thermal energy from the oil of the gear unit cooling system 18 to the interior air of the generator 11, which air is being cooled by the air-to-air heat exchanger 17 of the generator cooling system 16. Accordingly the recooling unit 19 of the gear unit cooling system 18 is integrated into the generator cooling system 16 in a similar manner to the first embodiment, as a result of which the previously described advantages are achieved.

Figure 3:
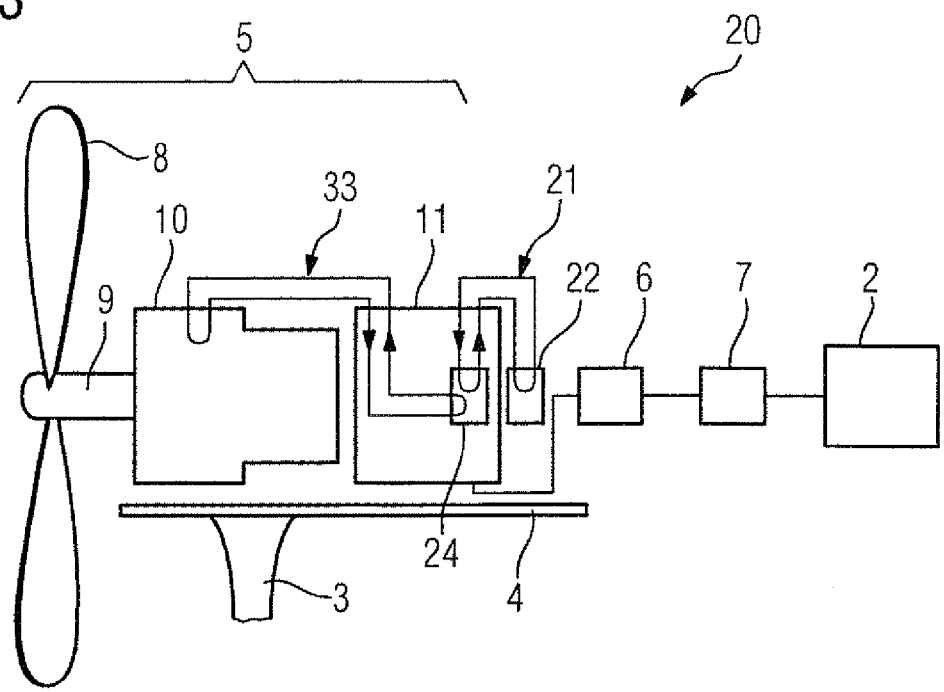
FIG. 3 shows a schematic illustration of a third embodiment of a wind turbine according to the present invention.

FIG. 3 shows a third embodiment of a wind turbine according to the present invention, generally designated by reference numeral 20. Parts corresponding with those in FIG. 1 are denoted by identical reference numerals and not explained again. The description below will center on the differences between the embodiments. In this embodiment, the wind turbine 20 includes a generator cooling system 21 which uses water as the cooling fluid and which is provided with a recooling unit 22 which dissipates heat at least partially to ambient air. The wind turbine 20 has a gear unit cooling system 33 which is operated with oil as the cooling fluid and has a recooling unit 24 integrated into the generator 11. The recooling unit 24 is designed as a water-to-oil heat exchanger through which both the cooling fluid of the generator cooling system 21 and the cooling fluid of the gear unit cooling system 33 flows, so that the thermal energy is exchanged between these media.

During operation of the wind turbine 20, the generator 11 is cooled by water flowing through the generator cooling system 21. The heated water is fed to the recooling unit 22 of the generator cooling system 21, in which thermal energy absorbed by the water from the generator 11 is extracted from the water. The water is then conducted back to the generator 11. The gear unit 10 is cooled by the oil of the gear unit cooling system 33. The heated oil is fed to the recooling unit 24 which is arranged in the generator 11 and in which it transmits the thermal energy absorbed in the gear unit 10 to the water of the generator cooling system 21. The oil is then conducted back to the gear unit 10.

Similarly to the wind turbines 1 and 15 of the first and second embodiments, respectively, the wind turbine 20 is characterized in that the recooling unit 24 of the gear unit cooling system 33 is integrated into the generator cooling system 21, which in turn is associated with the previously described advantages.

Figure 4:
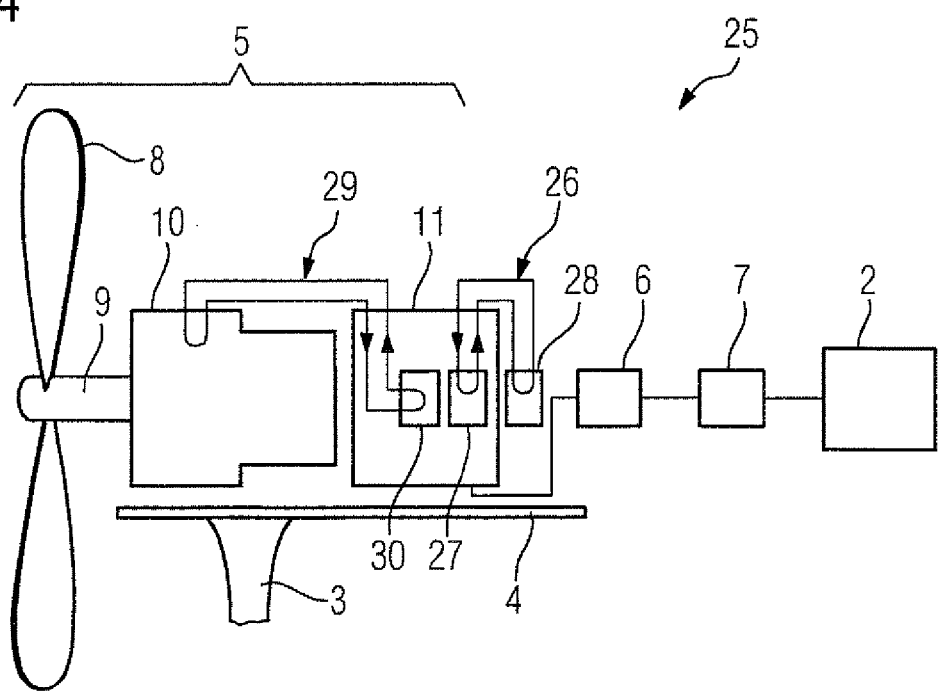
FIG. 4 shows a schematic illustration of a fourth embodiment of a wind turbine according to the present invention.

FIG. 4 shows a fourth embodiment of a wind turbine according to the present invention, generally designated by reference numeral 25. Parts corresponding with those in FIG. 1 are denoted by identical reference numerals and not explained again. The description below will center on the differences between the embodiments. In this embodiment, the wind turbine 25 has a generator cooling system 26 which is operated with water and includes a water-to-air heat exchanger designed and arranged such that during normal operation of the wind turbine 25 it transmits thermal energy from the air present in the interior of the generator to the cooling fluid of the generator cooling system 26. The generator cooling system 26 further includes a recooling unit 28 in which heat is extracted from the cooling fluid of the generator cooling system 26 and is then at least partially dissipated to the environment. The gear unit cooling system 29 of the wind turbine 25 is operated with oil as the cooling fluid and has a recooling unit 30, which in this case is an air-to-oil heat exchanger which is designed and arranged such that during normal operation of the wind turbine 25 it transmits thermal energy from the cooling fluid of the gear unit cooling system 29 to the interior air of the generator 11.

During operation of the wind turbine 25 the generator 11 is cooled by water flowing through the generator cooling system 26, with heat being extracted from the air in the interior of the generator inside the water-to-air heat exchanger 27 and then being transmitted to the cooling fluid of the generator cooling system 26. The heated water is fed to the recooling unit 28, in which the heat is again extracted and is dissipated at least partially to the environment. The cooled water is then conducted back to the generator 11.

The gear unit is cooled via the oil which flows through the gear unit cooling system 29. The heated oil is fed to the recooling unit 30, in which the oil transmits thermal energy to the interior air of the generator 11, with air being cooled by the water-to-air heat exchanger 27 of the generator cooling system 26. The cooled oil is then conducted back to the gear unit 10.

Similarly to the previously described embodiments, the wind turbine 25 is also characterized in that the recooling unit 30 of the gear unit cooling system 29 is integrated into the generator cooling system 26, as a result of which the previously described advantages are achieved.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A wind turbine, comprising:
   a generator including a generator cooling system configured for passage of a cooling fluid; and
   a gear unit including a gear unit cooling system configured for passage of a cooling fluid, said gear unit cooling system comprising a recooling unit configured to transmit during normal operation of the wind turbine thermal energy from the cooling fluid of the gear unit cooling system to air inside the generator or to the cooling fluid of the generator cooling system.

2. The wind turbine of claim 1, wherein the cooling fluid of the generator cooling system is air and the cooling fluid of the gear unit cooling system is oil, said recooling unit being configured as an air-to-oil heat exchanger which is integrated into the generator cooling system and configured to transmit during normal operation of the wind turbine thermal energy from the cooling fluid of the gear unit cooling system to the cooling fluid of the generator cooling system.

3. The wind turbine of claim 1, wherein the cooling fluid of the generator cooling system is air and the cooling fluid of the gear unit cooling system is oil, said generator cooling system including an air-to-air heat exchanger configured to transmit during normal operation of the wind turbine thermal energy from air inside the generator to the cooling fluid of the generator cooling system to thereby cool the air, said recooling unit being configured as an air-to-oil heat exchanger integrated into the generator and configured to transmit during normal operation of the wind turbine thermal energy from the cooling fluid of the gear unit cooling system to the air inside the generator.

4. The wind turbine of claim 1, wherein the cooling fluid of the gear unit cooling system is oil and the cooling fluid of the generator cooling system is water, said recooling unit being configured as a water-to-oil heat exchanger integrated into the generator cooling system and configured to transmit during normal operation of the wind turbine thermal energy from the cooling fluid of the gear unit cooling system to the cooling fluid of the generator cooling system.

5. The wind turbine of claim 1, wherein the cooling fluid of the generator cooling system is water and the cooling fluid of the gear unit cooling system is oil, said generator cooling system including a water-to-air heat exchanger configured cool the air inside the generator and to transmit during normal operation of the wind turbine thermal energy from the cooling fluid of the generator cooling system to the air inside the generator, said recooling unit being configured as an air-to-oil heat exchanger which is integrated into the generator and configured to transmit during normal operation of the wind turbine thermal energy from the air inside the generator to the cooling fluid of the gear unit cooling system.

* * * * *